INVENTOR.
BY DAVID M GOODMAN
A. J. Uydevik
ATTY.

INVENTOR.
BY DAVID M GOODMAN
A. J. Uydick
ATTY.

United States Patent Office 3,409,826
Patented Nov. 5, 1968

3,409,826
AUTOMATIC SWEEP FREQUENCY RATIO PLOTTER AND NON-LINEAR MEASUREMENT SYSTEMS
David M. Goodman, 3843 Debra Court, Seaford, N.Y. 11783
Application Apr. 1, 1960, Ser. No. 19,355, which is a continuation-in-part of application Ser. No. 485,001, Jan. 31, 1955, now Patent No. 2,931,900, dated Apr. 5, 1960. Divided and this application Aug. 5, 1965, Ser. No. 477,519
20 Claims. (Cl. 324—57)

This application is a division of my pending application Ser. No. 19,355 filed Apr. 1, 1960 (refiled as Ser. No. 467,424 on June 28, 1965; Ser. No. 19,355 then being forfeited by notice of May 4, 1966) which in turn is a continuation-in-part of my application Ser. No. 485,001 filed Jan. 31, 1955 now U.S. Patent 2,931,900 granted Apr. 5, 1960. This invention relates to the study of steady state, transient, linear, and non-linear electrical parameters and phenomena. In particular it is directed to means for measuring the relationship of two or more quantities in an electrical system. It is directed to making sweep frequency measurements of incident and reflected voltages in transmission lines, Nyquist polar diagrams, gain-phase plots, loss-phase plots, etc.

It has been proposed heretofore to measure impedance, admittance, the reflection coefficient, or any transformation thereof, or standing wave ratio by devices which entail time consuming operations. For example, means heretofore proposed for plotting impedance information on a steady state basis over a wide frequency range are complex in structure, cumbersome, costly to build, require large signal power, and involve a sacrifice of either wide frequency coverage or accuracy.

The instant invention overcomes these disadvantages characteristic of prior devices, and in addition may be used in many investigations involving the response of non-linear devices to varying amplitude test signals.

Accordingly, one of the primary purposes or objects of this invention is to reduce to an automatic process the otherwise time consuming and tedious operations required to measure the impedance, admittance, reflection coefficient, or any transformation thereof, of a component or device or system or network over an extended frequency range, or even at a single frequency.

Another of the primary purposes or objects of this invention is to display for observation, and for recording purposes the transient response of a component, device system or network induced by an amplitude step function, a frequency step function, any combination thereof, or by an arbitrary but controlled signal stimulus.

Another object of this invention is to obtain the response of a component, device, network or system to a continuous wave.

Another object of this invention is to obtain the response of circuits capable of absorbing very little amounts of power.

Another object of this invention is to provide means to observe, analyze, and record the transient response of a circuit, network, device, or system in such fashion that both the amplitude and phase response are displayed.

An additional object of this invention is to display independently or simultaneously the amplitude and phase response, properly defined, to a frequency discontinuity or to any combination of amplitude and frequency variations, repetitive or otherwise, of any device, component, network or system.

Another object of this invention is to provide means to plot the complex ratio between two or more signals, including means for controlling this ratio.

Another primary object of this invention is to provide means to display the non-linear response of a circuit, network, component or device to a controlled signal stimulus.

Another object of this invention is to perform the aforesaid general functions with a combination of circuits which preserves the accuracy of the system, and which permits the frequency range and power range under investigation to be varied.

Further objects and advantages of this invention will become more apparent from the following description of the invention taken in connection with the accompanying drawing wherein.

Figure 1:
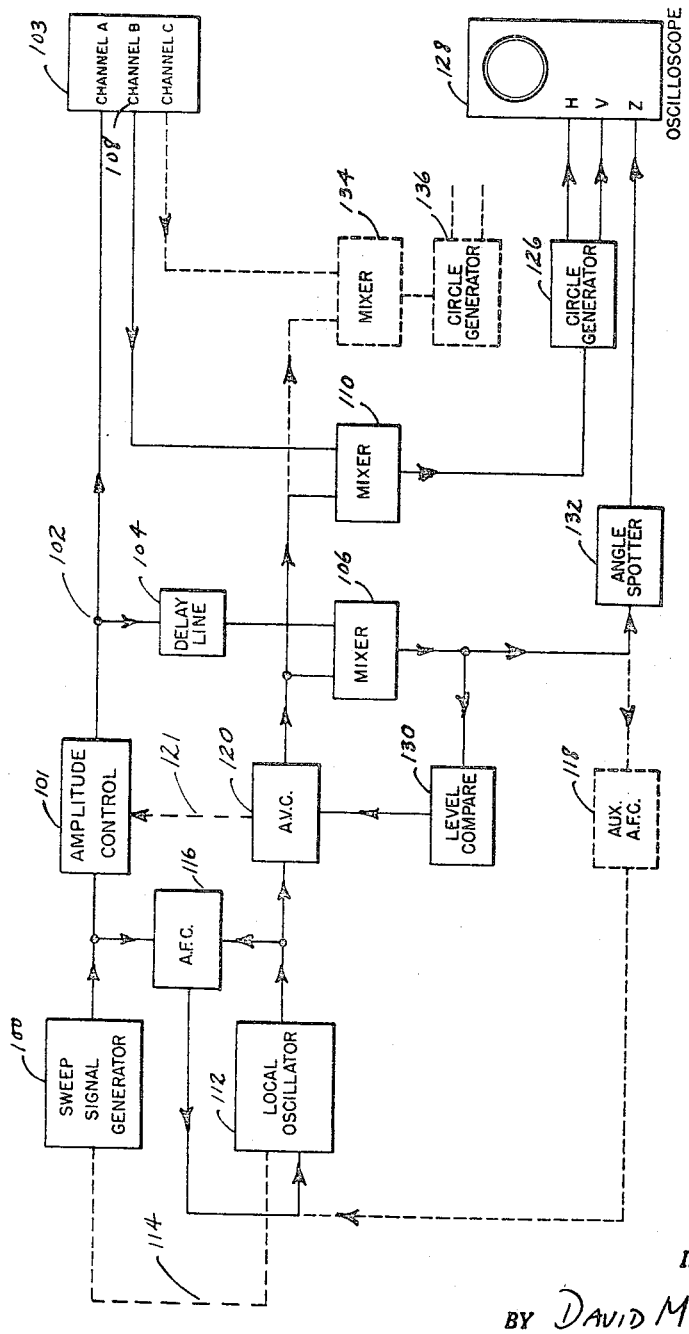
FIG. 1 is a block diagram showing a basic embodiment of this invention.

The block diagram of FIG. 1 shows a signal generator 100 feeding the line leading to a network 103 under test or investigation. This signal generator is capable of being set in amplitude and frequency. The signal generator is also capable of being amplitude modulated and frequency modulated at a controlled rate. The following description of the invention and the operation thereof is on a steady state basis where all variations are slow enough to be accurately followed by the various circuits and components.

The incident voltage (or line voltage, or quantities proportional to other parameters) is sampled at point 102 and transmitted through a delay means 104 to a mixer 106. Voltage is selected as being principally illustrative of the aforesaid quantities and, accordingly, the further description of this invention is set forth primarily in terms of voltage. Delay 104, which may be adjustable, causes the phase of the voltage at the mixer 106 to be properly related to the voltage which is sampled at point 108. This sampled quantity is transmitted to mixer 110.

In conjunction with signal generator 100 is a local oscillator 112 which furnishes a signal maintained at a fixed frequency difference with respect to the signal generator. This may be accomplished or assisted by mechanical constraint indicated by phantom gearing, as at 114, or it may be accomplished or assisted by an Automatic Frequency Control (AFC) loop operated through 116. It may be accomplished or assisted through a secondary AFC loop 118 but in any event local oscillator 112 tracks the signal generator 100 with a fixed frequency difference designated $f_d$. The output of local oscillator 112 feeds through an Automatic Volume Control circuit 120, to be described below, to mixers 106 and 110 which in turn are operated as linear converters and translate the sampled amplitude and phase information to the frequency $f_d$. This frequency generally is fixed. If it is adjustable it is selected for specific bands of frequencies within the range of signal generator 100. Each difference frequency is selected to reduce or eliminate harmonic problems, image problems, filtering problems, etc.

The output of mixers 106 and 110 contain the information, magnitude and phase, of the quantities previously sampled at 102 and 108. The output of mixer 110 feeds circle generator 126 which supplies two signals to the oscilloscope 128, the net result of which is to produce a circular sweep on the face of the oscilloscope tube. The radius of this circular sweep is controlled by the magnitude of the signal supplied from mixer 110. The frequency range over which the circle remains fixed in amplitude and circularity (for corresponding fixed amplitude input to the circle generator) may be made rather broad, in turn thereby partially reducing the requirements on the tracking of the signal generator and local oscillator.

Simultaneously the output of mixer 106 is held at a fixed amplitude by means 130, the level comparator, which varies the magnitude of the local oscillator injection voltage through automatic volume control means 120. Any change in the magnitude of the output of mixer 106 is immediately detected in 130, and through control means 120, the output of 106 is brought back to the proper level. Since both mixers, 106 and 110, are driven by the same injection voltage, and since both mixers operate linearly, the same scale change introduced in channel A is correspondingly affected in channel B. It is to be observed that the errors introduced by this multiplication process are completely controllable, calculable, and measurable, and are influenced by the amount of feedback in the AVC means 120, by the signal levels in the mixers, and by the properties of the mixers.

It now becomes clear that regardless of the amplitude variations in the signal generator output and/or of the local oscillator output, the output of mixer 106 is constant in amplitude. Since corresponding conversion gain changes have been made in both the channel A and channel B mixers the proportionality between the quantities sampled at 102 and 108 is preserved at the output of the two mixers. Hence the variations in the radius of the circular sweep presented at 128 are a direct function of the variations in channel B, and is displayed as it would be were the channel A voltage constant. It is to be noted that it is advantageous to introduce the AVC 120 through the local oscillator so that it is possible to amplitude modulate the main signal to observe linearity or amplitude sensitivity of the item under test. If this latter facility is not desired, the AVC circuits may equally well operate upon the main line signal.

Scale changes are effected by adjusting the comparison level at 130 or by adjustng the channel gains. For example, if reflection coefficient measurements are to be made on a transmission line where the magnitude of this reflection coefficient varies between 0 and 1, the scales are adjusted so that complete reflection produces a circle of a given diameter on the tube face. As the line approaches termination, and the reflected voltage decreases, the circle diameter decreases reaching, in the limit, a spot at the center of the scope. When making measurements other than reflection coefficients and where there may be gain in the system, from point 102 to 108, it is obvious that other scales will be more desirable.

To present the phase information, angle spotter 132 intensifies a particular portion of the circular trace produced above. Since the relative phase is required between the quantities sampled at 102 and 108, assuming sinusoidal steady state behavior, it is clear that the reflected wave, tracing a circle on the scope, may be used as the phase reference, where a particular point on the circumference corresponds to zero phase and which point is obviously adjustable and controllable. The point of intensification of the spot, however, is selected by taking the output of channel A from mixer 106, selecting a particular portion thereof to produce a sharp burst, as from a blocking oscillator which may be contained in 132, to Z-axis modulate the scope for intensification purposes, or for blanking.

It is clear, at this point, that certain alternate embodiments may be utilized depending upon the end use of this invention. For example, the automatic frequency control loops illustrated in FIG. 1 may be replaced with automatic phase comparison systems when desirable. The difference frequency $f_d$ may be either higher or lower than the test frenquency and may in fact be made equal to zero. Signals other than the main beat note may also be used for control or measurement purposes. The level comparator may keep the peak, the root-mean-square (RMS), or the average of the controlled channel constant. As previously noted the AVC means may also operate on the test signal. This is illustrated by optional connection 121 to amplitude control means 101. The local oscillator signal, shown in FIG. 1 as coming from an independent source, may be derived from the main signal generator. For example, a portion of the output of the main signal generator 100 may be isolated to serve as the local oscillator signal, and then may be phase and/or amplitude modulated in a controlled fashion where the extent of the modulation may itself serve as the AVC and/or AFC means. The delay provided by means 104 may be introduced through the local oscillator lines. A third mixer 134 with its associated circle generator 136 may be used to plot additional information on another indicator (not shown) or on indicator 128 by using a multi-gun tube or by time sharing the signals from circle generators 126, 136, etc. The "time-share" presentation is especially useful when the instant system is utilized in such form that the 90 degree phase shift used in circle generation is effectuated on the local oscillator signals and where the horizontal and vertical indicator deflection signals are presented as slowly varying direct current signals. It is also apparent that the reference signal, shown in FIG. 1 to emanate from point 102, may be arbitrarily chosen.

Figure 2:
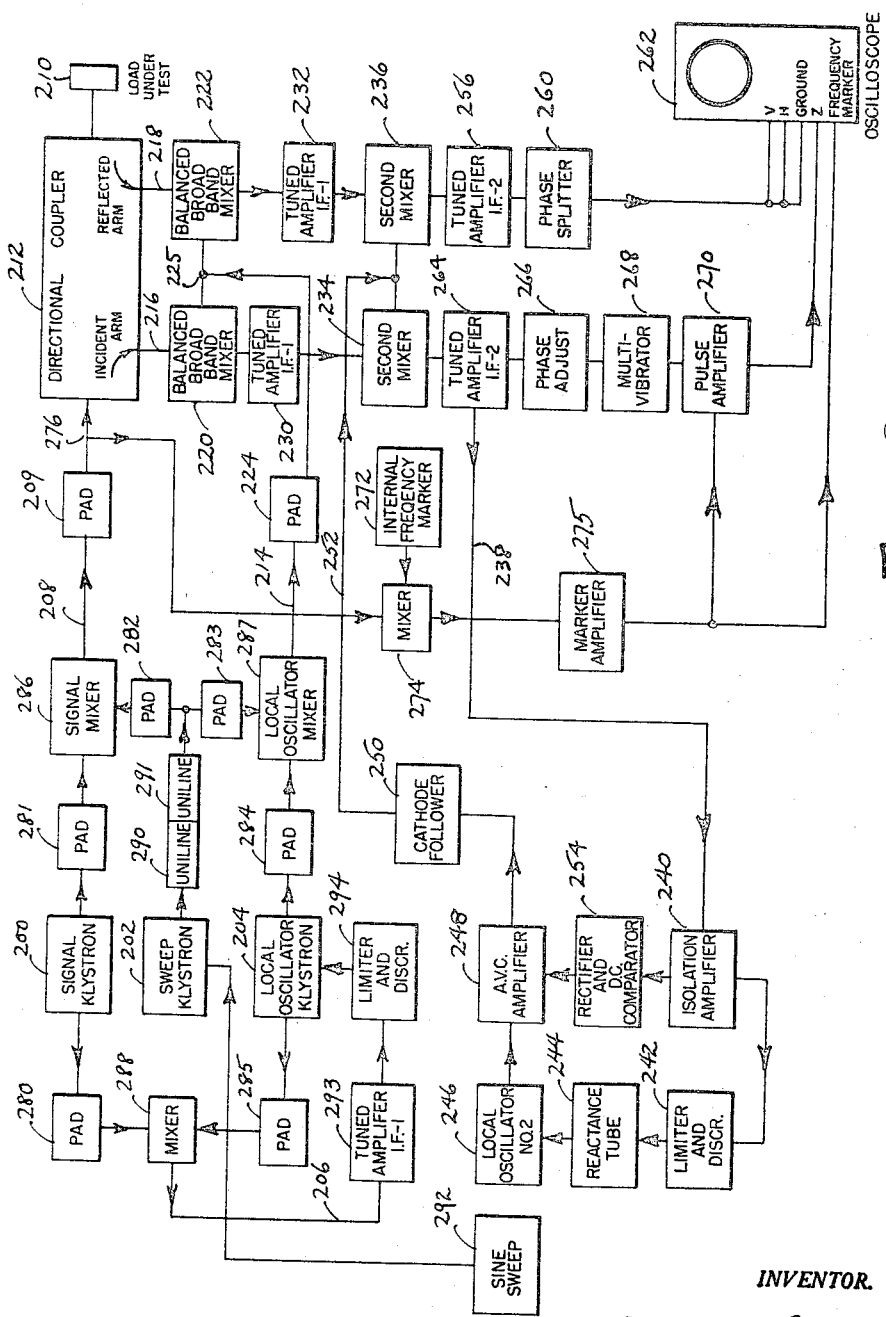
FIG. 2 is a block diagram of an embodiment of this invention as used to measure, by means of a Smith Chart display, the impedance or admittance of coaxial line elements over the frequency range 400–1600 megacycles.

FIG. 2 is a block diagram of an embodiment of this invention which accurately and rapidly plots the magnitude and phase of the reflection coefficient of coaxial line elements, terminations, networks, etc. By means of a Smith Chart overlay on a flat-face oscilloscope the data is immediately transcribed into an impedance or admittance plot. Provisions are made for wide band sweeps, or for single frequency plots, with intensifying and blanking controls to locate discrete frequencies. The sensitivity of the instrument allows measurements to be made on any element capable of dissipating fractions of a milliwatt on a steady state basis. The frequency range covered is 400–1600 megacycles.

The magnitude and phase of the reflection coefficient of an impedance determines the parameters of the impedance and is especialy well adapted for transmission line circuit analysis. As normally defined, the reflection coefficient is a linear fractional transformation of the impedance on a transmission line. This information has taken practical form in the use of the "Smith Chart." By ploting the magnitude and phase of the reflection coefficient on a polar coordinate system it is possible to read from a Smith Chart overlay the series components of the unknown impedance. Due to the nature of the linear fractional transformation it is also possible to read the admittance of the test component by reversing the position of the reflection coefficient by rotation thereof through 180 degrees. The instant invention when used as an "Impedance Bridge" enables one to read the impedance, or admittance, information directly from the face of the indicator by means of a transparent Smith Chart overlay.

The organization of the system illustrated in FIG. 2 is as follows: Three X-band klystrons, 200, 202, 204, are tied together by means of an automatic frequency control circuit or loop 206 (comprising signal klystron 200, pad 280, mixer 288, local oscillator klystron 204, pad 285, tuned amplifier 293, and limiter and discriminator 294) to furnish two signals in the frequency range 400–1600 megacycles. The two signals are swept through 100 megacycle bands once per second by sine sweeper 292, the two signals are separated from each other by approximately 21 megacycles which corresponds to $f_d$ discussed in connection with FIG.1. One of these signals, derived from mixer 286, is transmitted through line 208 and attenuator 209 to feed the unknown load 210 through a directional coupler 212. The other signal, derived from mixer 287, is transmitted through isolating pad 224 and is used for local oscillator purposes. The directional coupler 212 has two coupling elements, one of which picks off the incident voltage; the other picks off the reflected voltage. Resistance loaded loops are used for the coupler take-offs. The incident and reflected voltages, thus sampled, are transmitted through 50 ohm coaxial cables, 216, 218, to low level, high-conversion, balanced broad-band mixers, 220, 222, respectively. The local oscillator signal is injected into the broad-band mixers through amplitude and phase balanced T's and pads shown symbolically at 225.

The output of each of the broad-band mixers (220, 222) passes through phase balanced low gain 21 megacycles intermediate frequency amplifiers 230, 232, and are further reduced in frequency to 15 kc. in the mixers 234 and 236. The second automatic frequency control signal is derived from the circuit or loop composed of line 238, isolation amplifier 240, limiter and discriminator 242, reactance tube 244, second local oscillator 246, AVC amplifier 248, cathode follower 250 and line 252. The automatic volume control signal is derived from the circuit or loop composed of 238, 240, rectifier and D.C. comparator 254 and 248, 250 and 252. Thus, the frequency control signal and amplitude control signal have been combined and are introduced in the second mixers 234 and 236. The AVC signal may also be introduced at other points in the system where it will multiply the incident and reflected signals by equal factors. The signals travelling through the mixer 220, the amplifier 230, the second mixer 234, tuned amplifier 264, etc. are proportional in amplitude and phase to the incident voltage of the directional coupler. The signals travelling through mixer 222, tuned amplifier 232, second mixer 236, tuned amplifier 256, etc. are proportional in amplitude and phase to the reflected voltage. After reduction to 15 kc., the reflected voltage is transmitted through filtering amplifier 256, to phase splitter 260, whence it emerges as two signals of about equal magnitudes, separated in phase by approximately 90 degrees. The signals are transmitted as vertical and horizontal feeds, V and H respectively, to the oscilloscope 262 to produce a circular deflection on the screen. The incident voltage is transmitted through filtering amplifier 264, through phase adjuster 266, to synchronize a free running multi-vibrator whose output 268 is subsequently differentiated and amplified by pulse amplifier 270 for Z-axis modulation of the oscilloscope so that the reflected signal is made to appear at the proper phase point.

A self contained oscillator 272 generates signals from 400–1600 megacycles and is included for pin-pointing specific test frequencies on the Smith Chart display. If additional accuracy be desired in frequency location, an external source may replace generator 272. This marker frequency feeds one side of a crystal mixer 274. The other input to the mixer 274 is derived from the main transmission 208 but decoupled approximately 35 db at point 276. When the signal frequency and marker frequency coincide the output from mixer 274 is amplified in marker amplifier 275, and detected to furnish appropriate polarities for pulse amplifier 270 or oscilloscope 262 for subsequent intensification or blanking of the Smith Chart display.

The remaining elements of FIG. 2, to wit, pads 281, 282, 283, 284, and unidirectional transmission line elements 290, 291 are used for isolation purposes. The signal output of the waveguide crystal mixer 286 passes through the 6 db pad 209, and is transmitted past point 276 where the signal is decoupled 35 db, as previously explained, to furnish the marker signal. The signal then feeds into the directional coupler 212 which is terminated in the impedance 210. The directional coupler 212 has a low main-line voltage standing wave ratio (VSWR) so that it does not introduce errors into the measurements. The two side arms, incident and reflected, are sufficiently decoupled from the main-line so that the field set up by the impedance 210 in the directional coupler 212 is not disturbed. The orientation of the coupling loops in the directional coupler are so arranged that one output will be proportional to the incident voltage while the output of the other arm is proportional to the reflected voltage. The coupling elements themselves are terminated in 50 ohms with capacity tab compensation. The VSWR looking into the side arms is held to a low value so that the effects of multiple reflections and local oscillator injection, to be described later, will be controllable. The absolute coupling of the two arms need not be the same but the variation with frequency, e.g., 6 db per octave, is matched within a fraction of a db in both arms. Since the path length travelled by the reflected wave is greater than that travelled by the incident wave, it is necessary to lengthen the coaxial cable that carries the incident voltage from the directional coupler to the broad-band mixer 220. Normally the plane of reference is established at the end of the connector which terminates the directional coupler. More specifically, the plane of reference is that of a short connected to the output of the directional coupler 212. Other coaxial cables may be supplied to enable remote measurements to be made with the equipment. For example, when measurements are to be made at the end of a 10 foot cable, the cable to compensate for line length which is used in the incident channel will be approximately 20 feet long.

Figure 3:
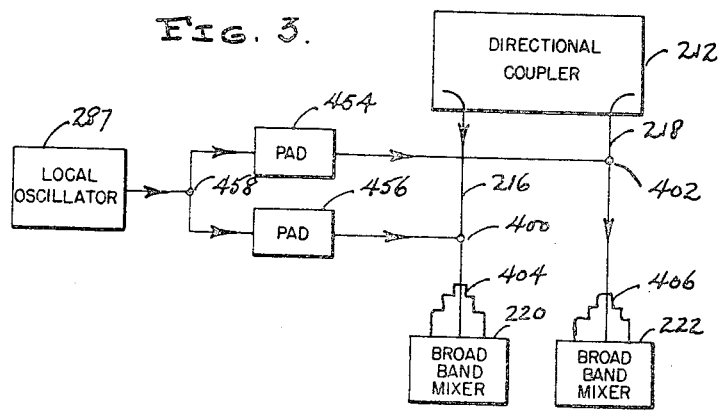
FIG. 3 shows means for injecting an auxiliary, or local oscillator, signal into the system illustrated in FIG. 2.

FIG. 3 illustrates the coupler connections and the means used for local oscillator injection. It is seen that two L-band signals are derived from the coupler 212, one proportional to the incident voltage, the other proportional to the reflected voltage, without disturbing the field pattern in the main-line. Each of the two signals is transmitted through a 50 ohm cable 216 and 218 through coaxial T's 400 and 402 to a three step transition 404 and 406 terminated in the internal impedance of a grounded grid Western Electric Type 416A or Western Electric Type 416B Triode contained in 220, 222. Simultaneously the local oscillator 287, feeds a T 458, which in turn feeds pads 454 and 456. The local ocillator signal that emerges from pad 454 passes via coaxial cable to T 402 and thence to mixer 222. At the same time the local oscillator signal that emerges from pad 456 passes via coaxial cable to T 400 and thence to mixer 220. The T 458 is balanced. The pads 454 and 456, and the T's 400 and 402 are matched in both amplitude and phase behavior in the frequency range under consideration. Similarly the broad-band mixers 220 and 222 (alike in construction) are matched. The signal levels of both the local oscillator and the incident voltage are of a low order of magnitude to make the conversion through the 416 troide a linear process, both amplitude and phasewise. The operational properties of the two mixers 220 and 222 are established so that the functional behavior of the two mixers is identical over the frequency range 400–1600 megacycles.

The output of the mixer in the incident channel is a 21 megacycle signal, the amplitude and phase of which are related to the incident voltage on the transmission line but now at a frequency of 21 megacycles. The 21 megacycle signal out of mixer 222, derived from the reflected channel, contains similar information with respect to the voltage reflected from the termination on the main transmission line. The two 21 megacycle signals produced by mixers 220 and 222 take the courses shown in FIG. 2. The signal produced in 220 passes through a 21 megacycle tuned amplifier 230, the purpose of which is to eliminate spurious signals; and to adjust the level for proper operation of the second mixer 234. The signal produced in 222 passes through a similar amplifier 232 into mixer 236. The two amplifiers 230, 232, are balanced with regard to phase over a band of frequencies sufficiently broad to insure proper operation if the 21 megacycle difference frequency drifts from its set value. The incident channel and reflected channel second mixers, 234, and 236, are fed at their respective grids with the two 21 megacycle signals. At the same time a signal is injected that originates in local oscillator 246, operating at a frequency of 15 kc. removed from 21 megacycles. The low noise figure triode mixers, 234, 236, are capable of handling a large dynamic range. The dynamic range requirements are necessitated by the variations in the incident voltage in the main transmission line and by virtue of the 40 db variations to be measured in the reflected channel signal. The two mixers also simultaneously perform the important function of the automatic volume control. The signal levels of both mixers are sufficiently low so that the conversion process again is linear. This linear property assures an identical scale factor change in the reflected channel for a controlled scale factor change in the incident channel. The outputs of the second mixers 234 and 236 pass through tuned amplifiers 264 and 256 respectively, both amplitude and phase balanced, and the signals emerge at 15 kc. Hence by maintaining the voltage at the output of 264 at a constant value, the proper scale is maintained for the reflected voltage on the Smith Chart display.

The output of mixer 236 passes through tuned amplifier 256; both to eliminate spurious signals and to set the signal level and thence is transmitted to phase splitter 260. One of the outputs of 260 drives the vertical deflection system in the indicator unit 262 while the other signal, shifted in phase by 90 degrees, drives the horizontal deflection circuits in the indicator unit 262. The result is a circular deflection pattern revolving at a 15 kc. rate on the face of the oscilloscope. The radius of this circle is adjustably controlled by means of a single control by varying the channel gain ahead of the phase splitter 260. This radius is normally adjusted to coincide with the outside circle of the Smith Chart for a short or open circuit termination on the L-band directional coupler 212. To magnify the presentation of the reflection coefficient the gain in the reflected channel may be increased, or due to the automatic volume control features, the gain in the incident channel may be decreased. In this embodiment provisions are made for increasing this gain by a factor of two by means of a front panel designated "normal-expand." The 90 degree phase shift circuit is relatively broad-band so that drifts in the frequency of the 15 kc. signal will not introduce excessive error.

It is to be noted that the voltage emerging from 264 is isolated to perform many functions. The incident voltage, now at 15 kc., is amplified and filtered in 264, and through a cathode follower contained in 266, feeds a phasing circuit also in 266 which is controllable in two respects. The phase may be shifted by 180 degrees, which controls the choice of impedance or admittance display, or the phase may be varied continuously over approximately 50 degrees to adjust the phase of the spot that eventually appears on the Smith Chart display. Normally this control is set for zero phase when in the impedance position and with a short circuit for termination. Then the 15 kc. signal, after phase alteration in 266 synchronizes a 15 kc. multi-vibrator 268 whose output is differentiated. The resultant spike, approximately one-half microsecond in duration, is amplified in 270 and transmitted for Z-axis modulation of the indicator unit, 262. Simultaneously, the 15 kc. voltage emerging from 264 is transmitted by 238 to isolation amplifier 240, thence to 242 wherein the signal is further amplified, limited, and drives a 15 kc. discriminator. The output of 242 controls reactance tube modulator 244. The modulator in turn varies the frequency of the second local oscillator 246 (set to be 15 kc. removed from 21 megacycles). The output of 248 feeds cathode follower 250, whence it is transmitted via 252 to second mixers 234 and 236. The loop gain of the second automatic frequency control circuit, comprising 234, 264, 238, 240, 242, 244, 246, 248, 250, and 252 is approximately 40 db. The effective band-width in this loop is approximately 5 kc. A network between 242 and reactance tube modulator 244 stabilizes this feedback loop. Also simultaneously the voltage emerging from 264 and in conjunction with feedback loop 238, 240, 254, 248, 250, 252, and 234 and 236 controls the overall gain of the system. This is accomplished by amplification in 240, the output of which feeds a biased detector in 254. When the voltage output of 240 exceeds a predetermined level, set in 254, a signal is obtained in 254 which ultimately reduces said voltage output. The output of 254 controls the gain of AVC amplifier 248. Hence as the signal emerging from 264 exceeds a predetermined level, the output of 248 is reduced to maintain the signal emerging from 264 at a constant level. In this embodiment the gain of this last described loop is approximately 40 db. Deviation of the magnitude of the signal emerging from 264 from the set value is inversely proportional to the AVC loop gain. Simultaneously any deviation in the signal emerging from 236 from its proper value is inversely proportional to the AVC loop gain. The effective bandwidth in this last mentioned feedback loop is also approximately 5 kc. The stabilizing networks are located between the biased detector in 254 and an amplifier also in 254. The output of AVC amplifier 248 feeds a cathode follower 250 which is matched to 90 ohm cable 252.

The vertical and horizontal signals from 260 are transmitted at a voltage level of approximately 1 volt to reduce the effects of stray pick-up. The indicator 262 is a modified Dumont Type 304A oscilloscope. The Y-axis amplifier in 262 has the low level stages removed to reduce the drift and in its place a single stage phase inverter is inserted. The overall display is relatively accurate. The Dumont Type 5–ADP is a flat-face electrostatic focus and deflection cathode-ray tube with very high sensitivity deflection plates. The high sensitivity is achieved by using long deflection plates, limiting the scan to a useful portion of the full screen diameter. The flat surface of the tube face greatly improves the optical quality of the 5–ADP over that of other 5-inch tubes. In addition, tolerances are very closely controlled; angle alignment between the deflection plates held to within 1 degree, while deflection factors are held to within 10 percent with pattern distortion less than 2 percent over a considerable area. The spot size and optical resolution is in the order of ½ percent of full-scale. With an expanded presentation the center of the Smith Chart can be magnified so that the resolution may be increased.

The oscilloscope has been modified to allow for the mounting of either a complete Smith Chart or an expanded Smith Chart. Either of the Smith Chart overlays is mounted adjacent to the flat-face of the cathode-ray tube to reduce parallax errors. The Smith Chart may be rotated so that small line length corrections may be inserted.

On a single frequency sinusoidal steady state basis the operation of the instant invention is clear. A spot, bright or dark, will appear on the face of a CRT, or other indicator, which spot will be a plot of the reflection coefficient vector. As the frequency of the test signal varies, and assuming a change in the magnitude and/or phase of the load impedance with frequency, the spot will move across the face of the CRT plotting the loci of the continuously varying reflection coefficient as a function of frequency. The maximum allowable speed at which this test frequency may vary depends upon the various components and circuits and mostly upon the bandwidths associated with the various circuits. The maximum allowable sweep frequency may be determined experimentally by applying a resistive load, or a short or open circuit, in the reference plane and by increasing the sweep speed until the spot position indicates an error in excess of that allowed on a steady state basis. Below this maximum sweep rate conditions the instrument will accurately record the "transient response" of any termination which is swept at a lesser rate and whose intrinsic variations with frequency do not exceed the bandwidth limitations of the reflected channel.

The linear conversion process referred to previously may be set forth in mathematical terms as follows.

Sampled quantity:
$$V_1 \cos \omega_1 t$$
$$V_r \cos (\omega_1 t + \theta_r)$$

Converted quantity:
$$kV_1 \cos (\omega_2 t + \theta)$$
$$kV_r \cos (\omega_2 t + \theta + \theta_r)$$

It will be observed that the ratio of the magnitudes of $V_1$ and $V_r$ remain unchanged and that the phase difference $\theta_r$ between the two sampled quantities remains the same after conversion to the second frequency $\omega_2$. Any device or devices capable of multiplying each of two signals by a third signal, while at the same time preserving the desired relationship set forth above, may be used in place of the mixers referred to above.

To measure the response of a device to a signal of varying amplitude it is clear that $V_1$ must be made to vary in amplitude. This may be accomplished in FIG. 1 via amplitude control means 101, and in FIG. 2 by replacing pad 209 with an independently controlled attenuator.

Figure 4:
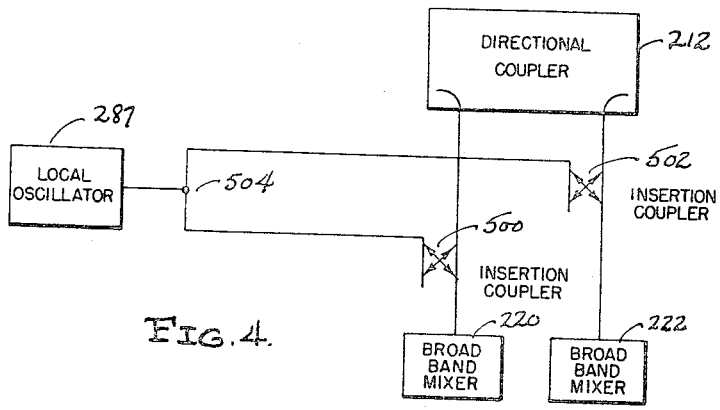
FIG. 4 illustrates alternate means for local oscillator injection into the broad-band mixers.

An alternative to the means illustrated in FIG. 3 for local oscillator injection is shown in FIG. 4. The signal supplied by 287 feeds symmetrical T 504 which in turn feeds two directional couplers 500 and 502. Coupler 500 combines the signal from the incident arm of the coupler 212 with the signal from 287, both of which are fed to mixer 220. Coupler 502 combines the signal from the reflected arm of the coupler 212 with the signal from 287, both of which are fed to the mixer 222. The two couplers 500 and 502 have similar characteristics. When the broadband mixers 220 and 222 represent a matched load to input signals, the isolation between channels becomes a function of the coupling factor and directivity of the couplers 500 and 502. The resultant combination minimizes the signal losses while maximizing the isolation between mixers 220 and 222. The coaxial transitions 404 and 406 need not be three step as outlined in FIGURE 3, need not be abrupt transition, and may be constructed for different line impedances. These variations depend upon the frequency range under consideration. In fact, at the lower frequencies the coaxial construction may be replaced by conventional line connections and wiring and the directional couplers themselves may be replaced by Wheatstone Bridge circuits. At the lower frequencies each of the mixers may operate push-pull with attendant improvement in performance and rejection of local oscillator signal.

In both FIGURES 1 and 2 circle generators are illustrated. These generators may be of the phase splitter type or 90° phase shift delay generators. In either case the resultant polar coordinate display is especially well suited for Smith Chart operation or for Nyquist displays. In other cases, such as in transient study or for a non-linear test termination, or even for steady state measurements, an amplitude time indicator or an orthogonal magnitude-phase plot may be more desirable in the way of display. An amplitude time response is available at the output of the reflected channel at any point before the circle generator. A magnitude-phase plot may be presented from this same point in conjunction with a continuous phase angle reader. A still further means for display may be provided when the magnitude of the in-phase and out of phase components of the response is desired in preference or in addition to that information already available. In such case, the local oscillator signal is coherent (even when modulated) with the test signal while one mixer is fed by the local oscillation signal and the other mixer is fed by the local oscillator signal shifted by 90 degrees. A broad-band directional coupler yields this phase shift over a wide frequency range. Expressed in mathematical terms this operation may be represented by Sampled quantity:
$$V_r \cos (\omega_1 t + \theta)$$

Converted quantity:
$$k_1 V_r \cos \omega_1 t \; (\cos \omega_1 t + \theta)$$
$$k_2 V_r \cos (\omega_1 t + 90°) \; (\cos \omega_1 t + \theta)$$

with the resultant output after low pass filtering of $$a_1 V_r \cos \theta \text{ and } a_2 V_r \sin \theta$$

where $a_1$ and $a_2$ are scale factors. In the case of a modulated local oscillator signal the outputs are in terms of the modulation applied and such output modulation terms are included in the constants $a_1$ and $a_2$. The modulation terms of the local oscillator signals are contained in the factors $k_1$ and $k_2$. The operations required to relate $V_r$ to $V_1$ have been discussed previously.

Reference is made to applicant's U.S. Patent 2,931,900, supra, for details concerning the construction of a signal generator and a tracking local oscillator which may be used to provide test signals in the range 400–1600 megacycles. Reference is also made to applicant's co-pending application Ser. No. 467,424, supra, for details concerning the construction of broad-band mixers 220 and 222 referred to hereinbefore. Additional details on specific circuitry are omitted for it is believed a full description thereof is unnecessary for circuit designers skilled in this art to successfully implement the foregoing teachings.

It will be understood that the foregoing description of the invention and the embodiments and alternatives set forth are merely illustrative of the principles thereof. For example, the basic concepts disclosed in this invention are directly applicable to the test and measurement of sinusoidally varying optical signals as well as to the test and measurement of mechanical components which are excited by sinusoidal forces. Accordingly, the appended claims are to be construed as defining the invention within the full spirit and scope thereof; and therefore I claim:

1. The method of measuring the non-linear response of an item under test comprising the steps of (1) generating a first varying test driving function whose amplitude is made to increase in magnitude with respect to time, and (2) generating a related second varying signal, and (3) sampling the test function applied to the item under test, and (4) sampling the response of said item, and (5) multiplying each of the two samples with said second signal thereby producing a third signal derived from said test signal and a fourth signal, derived from the response of the item under test, both said third and fourth signals being representative of the products of said second signal with each of the two said samples, respectively, and (6) automatically adjusting the amplitude of said second signal in order to maintain said third signal constant in amplitude, and (7) automatically indicating the characteristics of said fourth signal thereby to yield the non-linear response of said item under test.

2. The method of measuring the non-linear response of an item under test comprising the steps of (1) generating a first sweep frequency sinusoidally varying test driving function whose peak amplitude is made to increase in magnitude with respect to time, and (2) generating a related second sinusoidally varying signal, and (3) sampling the test function applied to the item under test, and (4) sampling the response of said item, and (5) multiplying each of the two samples with said second signal thereby producing a third signal derived from said test signal and a fourth signal, both said third and fourth signals being representative of the product of said second signal with each of the two said samples, respectively, and (6) automatically adjusting the amplitude of said second signal in order to maintain said third signal constant in amplitude, and (7) automatically indicating the characteristics of said fourth signal thereby to yield the non-linear and sweep-frequency response of said item under test.

3. A system for measuring the response of a device to a signal that varies in amplitude comprising: means for generating a periodic time varying test signal, means for generating a second periodic time varying signal, means for modulating the amplitude of the test signal with said second periodic time varying signal, means for applying the thus amplitude modulated test signal to the device whose response is to be obtained, means for generating a reference signal related to the test signal, first and second product mixers each having a reference signal input, the first product mixer coupled to receive a signal input representative of the amplitude modulated test signal, the second product mixer coupled to receive a signal input representative of the response of the device to the amplitude modulated test signal, and means responsive to the amplitude of the output of said first product mixer that automatically controls the amplitude of the reference signal input fed into the first and second product mixers thereby to maintain substantially constant the first mixer output signal, and means responsive to the output of said second product mixer for automatically furnishing a signal indicative of the response of the device to the time varying test signal.

4. A system defined by claim 3 including means for generating a second reference signal, in combination with third and fourth product mixers, means for coupling said second reference signal to said third and fourth mixers, means for applying the output signal of the first mixer to said third mixer, means for applying the output of the second mixer to said fourth mixer, and further means responsive to the amplitude of the fourth mixer output that automatically controls the amplitude of the second reference signal input fed into the third and fourth product mixers thereby to maintain substantially constant the third mixer output signal, including further means responsive to the output of said fourth product mixer for furnishing a signal indicative of the response of the device to the test signal.

5. A system defined by claim 3 wherein the means for generating a reference signal related to the test signal comprises means for obtaining at least a portion of said test signal and means for modulating the thus-obtained signal.

6. A system for measuring the response of a device to a signal that varies in frequency comprising: means for generating a test signal, means for sweeping the frequency of said test signal, means for applying the thus frequency swept test signal to the device whose response is to be obtained, means for generating a local oscillator signal which tracks the swept test signal with a substantially fixed frequency difference, means for deriving a first signal representative of the input to said device and a second signal representative of the response thereof, two transmission paths, the first path carrying the first signal, the second path carrying the second signal, a first product mixer in the first path, a second product mixer in the second path, and means for injecting the local oscillator signal into the first and second product mixers, including AVC means for maintaining constant a third signal derived from the output of said first mixer, and means for automatically graphing a fourth signal derived from the output of said second mixer.

7. An electrical measuring device comprising a test signal source, means for continuously sweeping the frequency of said source, means for feeding the frequency swept test signal to an object to be tested, a local oscillator, a first mixer coupled to said source for receiving a first signal output indicative of the swept test signal and yielding a second signal output, at least one other mixer coupled to receive a third signal input indicative of the response of said object to be tested to the swept test signal and yielding a fourth signal output, means for coupling a fifth signal from the local oscillator into both said mixers, and automatic amplitude control means responsive to the signal output of said first mixer for controlling the amplitude of the fifth signal injected into both said mixers so that the second signal is proportional to the product of said first and fifth signals and the fourth signal is proportional to the product of said third and fifth signals, and means for automatically graphing a signal derived from said fourth signal.

8. A device in accordance with claim 7 including means for modulating the test signal source thereby to provide said local oscillator.

9. The method of measuring the performance of an item under test comprising the steps of (1) generating a time varying test function, and (2) applying the test function to excite the item under test, and (3) deriving a first signal representative of the test function and a second signal representative of the response of the item under test, and (4) generating a common time varying signal, and (5) multiplying the first signal and the second signal with the common signal thereby producing a third signal and a fourth signal representative of the product of the common signal with said first and second signals, respectively, and (6) automatically adjusting the amplitude of said common signal in order to maintain said third signal constant in amplitude, and (7) automatically indicating the characteristics of said fourth signal, thereby to furnish the response of the item under test.

10. The method of measuring the performance of an item under test comprising the steps of (1) generating a sinusoidally varying test function, and (2) applying the test function to excite the item under test, and (3) deriving a first signal representative of the test function and a second signal representative of the response of the item under test, and (4) generating a common sinusoidally varying signal, and (5) multiplying the first signal and the second signal with the common signal thereby producing a third signal and a fourth signal representative of the product of the common signal with said first and second signals, respectively, and (6) automatically adjusting the amplitude of said common signal in order to maintain said third signal constant in amplitude, and (7) automatically indicating the characteristics of said fourth signal, thereby to furnish the response of the item under test.

11. A test combination for measuring the ratio between two sinusoidally varying parameters which are representative of the performance of an item under test comprising: means for generating a sinusoidally varying test function; means for applying the test function to energize the item under test; means for deriving a first signal and a second signal from the energized item representative of its performance; means for generating a common sinusoidally varying signal; a first product mixer and a second product mixer; means for applying said common signal to both mixers; means for applying said first signal to the first mixer and said second signal to the second mixer thereby to provide from the first mixer a third signal representative of the product of the first signal and common signal and to provide from the second mixer a fourth signal representative of the product of the second signal and common signal; automatic amplitude control means responsive to said third signal for controlling the amplitude of said common signal, thereby to maintain substantially constant the amplitude of said third signal; and means for indicating the characteristics of said fourth signal.

12. The combination of claim 11 including means for frequency modulating said sinusoidally varying test function; and means for similarly modulating the frequency of said common sinusoidally varying signal.

13. The combination of claim 11 including means for amplitude modulating said sinusoidally varying test function.

14. The combination of claim 12 including means for amplitude modulating the test function.

15. The combination of claim 11 wherein the means for generating a common sinusoidally varying signal comprises modulation means which modulate the sinusoidally varying test function.

16. A device in accordance with claim 11 wherein said last mentioned means for indicating the characteristics of the fourth signal includes means to furnish the ratio between said fourth and third signals.

17. A test combination for measuring the ratio between two sinusoidally varying parameters which are representative of the performance of an item under test comprising: means for generating a sinusoidally varying test function; means for applying the test function to energize the item under test; means for deriving a first signal and a second signal from the energized item representative of its performance; means for generating a common sinusoidally varying signal; a first product mixer and a second product mixer; means for applying said common signal to both mixers; means for applying said first signal to the first mixer and said second signal to the second mixer thereby to provide from the first mixer a third signal representative of the product of the first signal and common signal and to provide from the second mixer a fourth signal representative of the product of the second signal and common signal; automatic amplitude control means responsive to said third signal for controlling the amplitude of said common signal, thereby to reduce the variations in amplitude of said third signal; a third product mixer and a fourth product mixer; means for generating a second common sinusoidally varying signal; means for applying said second common signal to the third and fourth product mixers; means for applying said third signal to the third mixer, and the fourth signal to the fourth mixer, thereby to provide from the third mixer a fifth signal representative of the product of its inputs and to provide from the fourth mixer a sixth signal representative of the product of its inputs; automatic amplitude control means responsive to said fifth signal for controlling the amplitude of said second common signal, thereby to maintain substantially constant the amplitude of said fifth signal; and means for indicating the characteristics of said sixth signal.

18. In combination: means for generating a sinusoidal test signal; means for generating a local sinusoidal signal having a frequency separated from said test signal by a frequency difference $fd$; means for applying the test signal to an object under test; means for deriving response signals from the object under test; first converter means for mixing a signal derived from the test signal with the local signal thereby to provide a reference signal linearly related to the test and local signals; second converter means for mixing the response signals with the local signal thereby to provide an information signal linearly related to the response and local signals; and means for taking the ratio of the information signal to the reference signal thereby to derive the characteristics of the object under test.

19. A device in accordance with claim 18 wherein said last mentioned means for taking the ratio of the information signal to the reference signal includes means for plotting said information signal on a circular trace, means responsive to the information signal for controlling the radius of the circular trace so as to be proportional to the amplitude of the information signal, and means for indicating on said circular trace the relative phase between the information signal and the reference signal.

20. In combination: means for generating a sinusoidal test signal; means for amplitude modulating the test signal to provide a local signal; means for applying the test signal to an object under test; means for deriving response signals from the object under test; first converter means for mixing a signal derived from the test signal with the local signal thereby to provide a reference signal linearly related to the test and local signals; second converter means for mixing the response signals with the local signal thereby to provide an information signal linearly related to the response and local signals; and means for taking the ratio of the information signal to the reference signal thereby to derive the characteristics of the object under test.

References Cited

UNITED STATES PATENTS

| 2,047,782 | 7/1936 | Jensen | 324—57 |
| 2,285,038 | 6/1942 | Loughlin | 324—57 XR |
| 2,562,759 | 7/1951 | Agar | 324—57 |
| 2,595,263 | 5/1952 | Ingalls | 324—57 XR |
| 2,685,063 | 7/1954 | Alsberg | 324—57 |
| 2,760,155 | 8/1956 | Kelly | 324—57 |
| 2,817,835 | 12/1957 | Worthington. | |
| 2,907,400 | 10/1959 | Swafford | 324—77 XR |
| 2,943,259 | 6/1960 | Hatch | 324—88 |
| 2,954,465 | 9/1960 | White | 324—77 XR |
| 2,954,524 | 9/1960 | Nelson | 324—57 XR |
| 3,101,448 | 8/1963 | Costas | 328—133 XR |
| 3,227,949 | 1/1966 | Oberbeck | 324—79 XR |
| 2,439,877 | 4/1948 | Stuart | 324—88 |
| 2,580,803 | 1/1952 | Logan | 324—88 XR |
| 2,605,396 | 7/1952 | Cheek. | |
| 2,735,064 | 2/1956 | Salzberg | 324—57 |

FOREIGN PATENTS

| 701,423 | 1/1941 | Germany. |
| 1,031,417 | 6/1958 | Germany. |

RUDOLPH V. ROLINEC, *Primary Examiner.*

E. E. KUBASIEWICZ, *Assistant Examiner.*